(12) United States Patent  
Saunders et al.

(10) Patent No.: US 9,154,045 B2
(45) Date of Patent: Oct. 6, 2015

(54) DISTRIBUTED POWER CONDITIONING WITH DC-DC CONVERTERS IMPLEMENTED IN HETEROGENEOUS INTEGRATED CIRCUIT

(75) Inventors: Jeffrey H. Saunders, Andover, MA (US); Michael G. Adlerstein, Wellesley, MA (US)

(73) Assignee: RAYTHEON COMPANY, Waltham, MA (US)

(*) Notice: Subject to any disclaimer, the term of this patent is extended or adjusted under 35 U.S.C. 154(b) by 576 days.

(21) Appl. No.: 13/269,397

(22) Filed: Oct. 7, 2011

(65) Prior Publication Data

US 2013/0088392 A1    Apr. 11, 2013

(51) Int. Cl.
*G05F 5/00*    (2006.01)
*H02M 7/00*    (2006.01)

(52) U.S. Cl.
CPC ............ *H02M 7/003* (2013.01); *Y02B 70/1483* (2013.01)

(58) Field of Classification Search
USPC ......... 363/15, 17, 21.01, 21.02, 21.04, 21.05, 363/21.09, 21.1, 21.11, 21.12, 21.16, 34, 363/59, 60, 92, 95; 323/222, 271, 282, 283, 323/284, 285; 257/255
See application file for complete search history.

(56) References Cited

U.S. PATENT DOCUMENTS

| 5,945,941 A | 8/1999 | Rich, III et al. |
| 7,736,966 B2 * | 6/2010 | Dyer et al. .................. 438/199 |
| 7,902,809 B2 | 3/2011 | Briere et al. |
| 2006/0039172 A1 | 2/2006 | Soldano |
| 2008/0184045 A1 * | 7/2008 | Koyama et al. ............... 713/300 |

(Continued)

FOREIGN PATENT DOCUMENTS

| TW | 20101025865 | 7/2010 |
| WO | WO 2004/047272 A2 | 6/2004 |

OTHER PUBLICATIONS

Doric Neacsu, "Implementation of Pulse Width Modulation Algorithms", In: "Power-Switching Converters", CRC Press, May 25, 2006 (pp. 187-217).

(Continued)

*Primary Examiner* — Matthew Nguyen
*Assistant Examiner* — Afework Demisse
(74) *Attorney, Agent, or Firm* — Christie, Parker & Hale, LLP

(57) ABSTRACT

A flat panel active electronically scanned array (AESA) (1) includes heterogeneous integrated circuit DC-DC voltage converters (3) periodically placed on array elements (2). A heterogeneous integrated circuit (100, 400, 500, 600) includes a voltage converter (101) configured to receive an input voltage ($V_I$), and to convert the input voltage to an output voltage ($V_O$) that is different from the input voltage, the voltage converter (101) comprising an analog and/or digital PWM circuit (104). The heterogeneous integrated circuit (100, 400, 500, 600) also includes a feedback circuit (103) configured to receive the output voltage ($V_O$), and to generate a control signal used to vary a pulse width of a PWM signal generated by the analog and/or digital PWM circuit (104). The digital PWM circuit (104) is implemented in a heterogeneous integrated circuit (100, 400, 500, 600) fabricated on a common substrate (606) using CMOS and GaN fabrication processes.

13 Claims, 9 Drawing Sheets

(56) References Cited

U.S. PATENT DOCUMENTS

| | | | |
|---|---|---|---|
| 2010/0127789 A1 | 5/2010 | Kenly et al. | |
| 2011/0025397 A1 | 2/2011 | Wang et al. | |
| 2011/0080156 A1 | 4/2011 | Briere et al. | |
| 2011/0095736 A1 | 4/2011 | Briere | |
| 2011/0180857 A1 | 7/2011 | Hoke et al. | |
| 2012/0146594 A1* | 6/2012 | Kobayashi | 323/234 |

OTHER PUBLICATIONS

Written Opinion of the International Searching Authority for International Application No. PCT/US2012/051003, filed Aug. 15, 2012, Written Opinion of the International Searching Authority dated Dec. 11, 2012 and mailed Dec. 18, 2012 (9 pgs.).

International Search Report for International Application No. PCT/US2012/051003, filed Aug. 15, 2012, International Search Report dated Dec. 11, 2012 and mailed Dec. 18, 2012 (4 pgs.).

International Preliminary Report on Patentability from Corresponding International Patent Application No. PCT/US2012/051003, filed Aug. 15, 2012, IPRP issued Apr. 8, 2014 and mailed Apr. 17, 2014 (9 pgs.).

Office action mailed Jul. 31, 2014 from corresponding Taiwan Patent Application No. 101130245, filed Aug. 21, 2012, published Mar. 28, 2013, Publication No. 201316667, with English translation of search (10 pgs.).

Lee, et al. "The Best Material for the Function: Seamless On-Wafer Integration of GaN and Si Devices", CS Mantech Conference, Palm Springs, California USA. May $16^{th}$-$19^{th}$, 2011, (4 pages).

Office action mailed May 8, 2015 from corresponding Korean Patent Application No. 2014/7012066, filed May 2, 2015, with English translation of search (12 pages).

Tucker, "Understanding Output Voltage Limitations of DC/DC Buck Converters", Texas Instruments Incorporated, Analog Application Journal Jun. 2008, (4 pages.).

Office action mailed Aug. 3, 2015 from corresponding Korean Patent Application No. 10-2014-7012066, filed May 2, 2014, with English translation of search (12 pages.).

\* cited by examiner

DISTRIBUTED POWER CONDITIONING WITH DC-DC CONVERTERS IMPLEMENTED IN HETEROGENEOUS INTEGRATED CIRCUIT

BACKGROUND

1. Field

One or more aspects of embodiments according to the present invention relate to a DC-DC converter and a method of manufacturing the same.

2. Description of Related Art

DC-DC converters are used to convert between higher and lower DC voltages in a variety of different devices. While some devices include one or only a few DC-DC converters, some systems include many hundreds to thousands of DC-DC converters. For systems that include hundreds or thousands of DC-DC converters, DC-DC converters can take up a lot of space. Further, as each DC-DC converter wastes power through heat loss, hundreds or thousands of DC-DC converters can result in loss of a large amount of energy.

A common DC-DC converter that takes as input a higher DC voltage, and converts it to a lower DC voltage, is known as a buck converter. A buck converter is typically more efficient than a linear power regulator. A typical linear voltage regulator may dissipate (Vin−Vout)*Iout watts as wasted heat, wherein Vin is the input voltage, Vout is the output voltage, and Iout is the current output. For example, a 40V to 28V linear regulator delivering 1 amp to a load may dissipate (40−28)*1=12 watts (W) as heat, while delivering only 28V*1 amp=28W to the load. The efficiency is therefore Pout/(Pout+Ploss)=28/(28+12)=28/40 =only 70%.

A buck converter can convert 40V to 28V at over 93% efficiency, with only 2 watts of power (heat) loss. For example, for a typical buck converter, Pout/(Pout+Ploss)=28/(28+2)=28/30=93%. A buck converter is a member of the switching mode power supply (SMPS) family, and hence uses a switching frequency, as well as a transistor switch, a diode, an inductor, and a capacitor.

A typical buck converter is illustrated in FIG. 1, and includes a FET $M_1$ that receives a pulse width modulation (PWM) signal input at its gate from a PWM circuit 20. The buck converter of FIG. 1 also includes an inductor L having a first end coupled to a source of the FET $M_1$. A drain of the FET $M_1$ is coupled to the positive terminal of a DC power source 10 having voltage Vs. A diode D is coupled between the first end of the inductor L and a negative terminal of the DC power source 10. A capacitor C and a resistor $R_L$ are coupled in parallel between a second end of the inductor L and the negative terminal of the power source 10.

In some cases, the diode D is used together with a second transistor in a "synchronous" buck converter, which is shown in FIG. 2. The synchronous buck converter of FIG. 2 is substantially similar to the buck converter of FIG. 1, except that a second FET $M_2$ is coupled across the diode D in parallel. For example, as can be seen in FIG. 2, a drain of the FET $M_2$ is coupled to a cathode of the diode D and a source of the FET $M_2$ is coupled to an anode of the diode D. The PWM output signal from the PWM 20 is also provided to a gate electrode of the FET $M_2$ in addition to the gate electrode of the first transistor FET $M_1$. For example, the diode D may only conduct when the FET $M_2$ is off, and the output voltage would vary depending on the duty cycle of the PWM output signal provided to the FET $M_2$. By way of example, the PWM control signals to the FETs $M_1$ and $M_2$ may have different phases and duty cycles.

A synchronous buck converter may be more efficient that a typical buck converter because the power (heat) loss through a field effect transistor (FET) is $I^2*Ron$, whereas the power loss thru a diode is Ploss=Vfwd*I, where I is the load current, Ron is the FET on-resistance, Vfwd is the forward voltage drop of the diode, and Ploss is the power loss. Since a FET can be designed with low on resistance, whereas a diode forward voltage drop is fixed by the diode material band gap, the FET can be made to have lower loss.

SUMMARY

It is desirable to reduce or minimize the space required by DC-DC converters, especially in systems where a large number of DC-DC converters are used. It is also desirable to increase the voltage conversion efficiency, thereby saving area and wasted power (heat) loss. Therefore, in exemplary embodiments according to the present invention, space utilization is improved or optimized.

When the DC-DC converters according to embodiments of the present invention are applied to flat panel active electronically scanned arrays (AESAs), power distribution and conversion is enabled within the radar unit cell, which may be as small as ½ inch by ½ inch, or even smaller depending on the frequency, thereby enabling advantageous features for ground based, air based, and space based applications.

In an exemplary embodiment according to the present invention, a heterogeneous integrated circuit includes: a voltage converter configured to receive an input voltage, and to convert the input voltage to an output voltage that is different from the input voltage, the voltage converter including a PWM circuit; and a feedback circuit configured to receive the output voltage, and to generate a control signal used to vary a pulse width of a PWM signal generated by the PWM circuit. The voltage converter and the feedback circuit together include at least one gallium nitride (GaN) circuit element and at least one CMOS circuit element that are integrated on a common substrate.

The PWM circuit may be a digital PWM circuit, and may include a counter, a decoder, and a flip flop.

The PWM circuit may include CMOS circuitry.

The heterogeneous integrated circuit may further include a level shifter to change a voltage level of the PWM signal outputted by the PWM circuit from a CMOS circuit level to a GaN circuit level.

The counter may include a Johnson counter, and the flip flop may include a JK flip flop.

The voltage converter may include a first GaN FET and a second GaN FET, wherein the PWM signal outputted by the PWM circuit is applied to gates of the GaN FETs.

The feedback circuit may include an error amplifier configured to generate a PWM control signal by comparing an output voltage of the voltage converter with a reference voltage (Vref).

The voltage converter may further include a comparator configured to generate a PWM control signal using the control signal from the error amplifier, and to supply the PWM control signal to the PWM circuit to vary the PWM signal.

The voltage converter may include a GaN FET and a level shifter and gate driver. The GaN FET may receive the PWM signal from the PWM circuit through the level shifter and gate driver.

The PWM circuit may be implemented in CMOS.

The level shifter and gate driver may be implemented in GaN, and may be configured to adjust a voltage level of the PWM signal from a CMOS circuit level to a GaN circuit level.

The heterogeneous integrated circuit may further include an RF power amplifier (RF PA) configured to receive a voltage output of the voltage converter as a drain voltage input, wherein the RF PA is implemented in GaN.

The PWM circuit may include a software algorithm for software-based synthesis of the PWM signal.

In another exemplary embodiment according to the present invention, a flat panel active electronically scanned array (AESA) includes: a plurality of array elements; and a plurality of DC-DC converters integrated with the array elements periodically disposed amongst the array elements.

Each of the DC-DC-converters may be integrated with a corresponding one of the array elements with a ratio ranging from 1:1 through 1:N, where N is the number of the array elements.

Each of the DC-DC converts may be disposed inter-stitially between adjacent ones of the array elements with a ratio ranging from 1:1 through 1:N, where N is the number of the array elements.

Each of the DC-DC converters may include a heterogeneous integrated circuit.

BRIEF DESCRIPTION OF THE DRAWINGS

The above and other features and aspects of the present invention will become more apparent by describing in detail exemplary embodiments thereof with reference to the attached drawings.

DETAILED DESCRIPTION

In embodiments according to the present invention, active electronically scanned arrays (AESAs) have distributed power conditioning, in which DC-DC converters according to embodiments of the present invention are periodically placed on the flat panel of the AESA.

According to other embodiments of the present invention, highly efficient and low cost DC-DC converters are provided. Such DC-DC converters may also be referred to as Switch Mode Power Supplies (SMPS). According to an embodiment, a DC-DC converter converts a higher DC voltage (e.g., 40 volts) to a lower voltage (e.g., 28 volts or 3.3 volts), with a little or minimum of heat loss (or reduced heat loss) and therefore high efficiency.

In embodiments according to the present invention, a DC-DC converter may be a synchronous buck converter implemented as a heterogeneous integrated circuit (IC) on a common substrate. The common substrate may be a silicon (Si) substrate, and the heterogeneous circuit elements may include CMOS and GaN devices. The synchronous buck converter may use a digital PWM circuit including a counter, a decoder, and a flip flop. The counter may be a Johnson counter, and the flip flop may be a JK flip flop.

The DC-DC converter may be used in applications such as AESAs. The AESA includes a plurality of array elements, and may be applied, for example, as a radar. In an AESA, the radar beam may be electronically scanned rather than having a moving component that spins around for scanning purposes.

AESAs may be implemented in a flat panel format having advantages in cost, size, weight and performance (CSWAP). In such an array, power amplifiers in the form of Microwave Monolithic integrated Circuits (MMICs) may be mounted directly to the flat panel such that each is connected directly to an associated one of array elements (e.g., a radiator). A schematic layout of a 16×16 element example of such an array is shown in FIG. 3.

Figure 1:
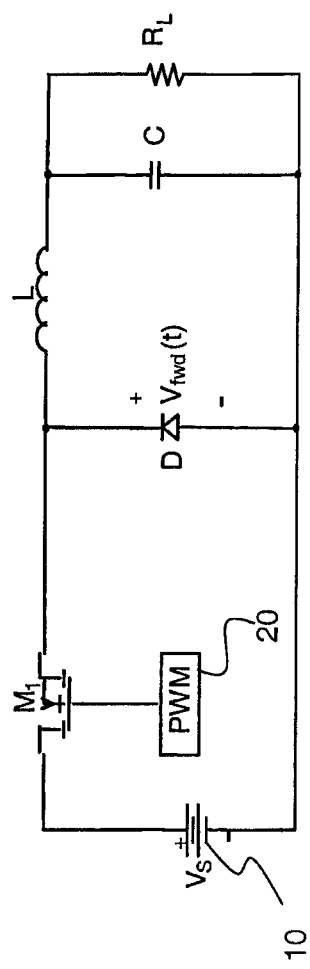
FIG. 1 is a schematic circuit diagram of a typical buck converter.
Figure 2:
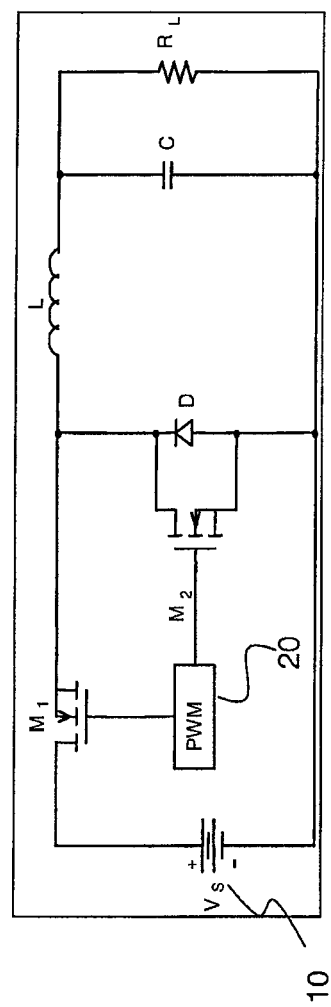
FIG. 2 is a schematic circuit diagram of a typical synchronous buck converter.
Figure 3:
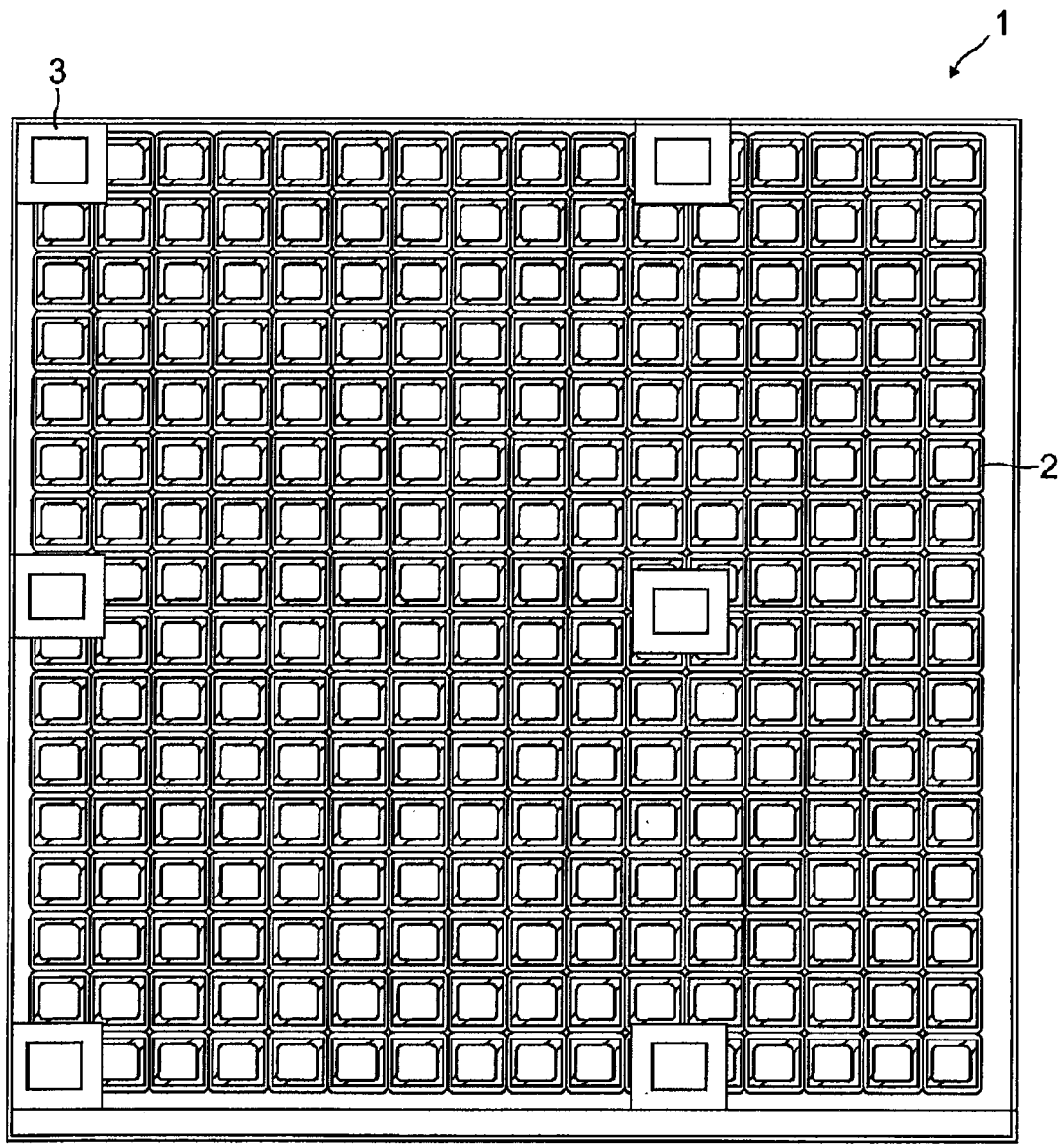
FIG. 3 is a schematic plan view of an active electronically scanned array (AESA) panel array according to an embodiment of the present invention.

FIG. 3 is a schematic plan view of a Flat Panel AESA 1. Each of the smaller boxes (e.g., array elements) in the 16×16 array of the Flat Panel AESA 600 represents an array element 2. The larger boxes represent periodic placement of DC-DC converters 3, which may allow higher voltage input to the power plane for a fixed element bias. The periodicity of the power converters may vary from 1:1 with the elements up to 1:N where N is the size (or number) of a group of elements powered by that converter.

In typical implementations, the bias input to each power amplifier may be provided by a continuous metallic layer (power plane) having a uniform applied voltage equal to that needed by the power amplifier. Each element or small group of elements might be associated with an energy storage capacitor to provide current at this voltage during the "on" pulse of the power amplifier.

The current needed to maintain the time average charge on such capacitors is typically provided from the power plane on a continuous (DC) basis through a small number of connectors. This current is accompanied by ohmic ($I^2R$) losses in the power plane. Further, there are voltage drops across the panel that may affect the uniformity of the voltage at each array element.

According to an embodiment of the present invention illustrated in FIG. 3, this problem is resolved or mitigated. The DC-DC converter according to embodiments of the present invention is replicated at regular intervals (up to and including one DC-DC converter at each array element in the array). According to an embodiment of the present invention, this converter may allow for the highest possible voltage to be used on the power plane (provided as the input to the converter) while providing the needed bias voltage at the power amplifier (provided as the output voltage of the converter). The net effect is lower current in the power plane and overall higher efficiency for the AESA. Here, efficiency may be defined as a ratio of the average amplifier output RF power to the average DC input bias power provided to the power plane. Success in achieving a net improvement in AESA efficiency may depend on the conversion efficiency of the DC-DC converter.

Figure 4:
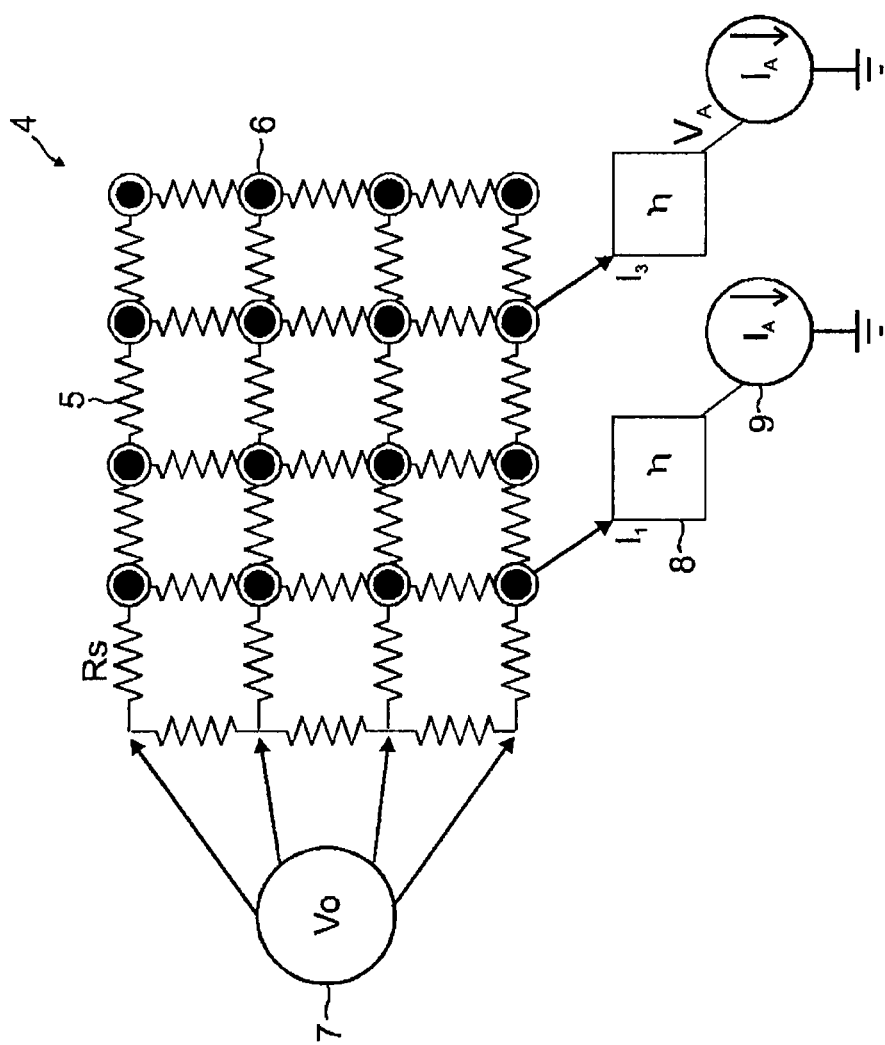
FIG. 4 is a resistive network schematically representing ohmic losses of the power plane of the AESA panel array of FIG. 3.

This point is illustrated by analysis of the simple AESA model in FIG. 4. FIG. 4 illustrates a simple resistive network 4 that represents the ohmic losses of the power plane. The power load at each network node 6 is represented as a current source 9 operating at a voltage of the power amplifier. In FIG. 4, only two of 16 such loads are shown for illustrative purposes only.

Here, the power plane is represented by a network of series and parallel resistors 5 each having a value Rs. There is an RF Power Amplifier (RF PA) at each node 6. The RF PA is represented as a current source 9 whose current value is the time average current of the associated RF PA. It is noted that the waveform at each RF PA may be a pulse train of duty cycle D. However, in combination with associated charge storage capacitors, the time average current flows in the power plane. This allows a DC current source to be used in the power plane model.

FIG. 4 represents the inserted DC-DC converter in series with each current source. An input voltage 7 is that on the power plane Vo and the output voltage is $V_A$, the operating voltage of the PA. The conversion efficiency 8 of the DC-DC converter, represented by a symbol η, is the ratio of the power supplied to the amplifier ($V_A I_A$) to the power input ($V_o I_n$) supplied to the DC-DC converter. Here, $I_n$ is the current from the power plane node to the DC-DC converter at element site n.

Therefore, the average power to the amplifier is $P_A = V_A I_A$. Further, the average input power to the converter in $V_A I_A / \eta$. To assess the impact of distributed power conversion, the analysis of the current flow in the power plane is simplified if its right edge is assumed to be at an equipotential. Then each row of amplifiers may be treated independently. Total power dissipation in the power plane is then the summation of that in each row, assuming that the voltage drops across the network resistors is small enough compared to $V_0$ such that $\Sigma(k=1 \ldots N) R_s k I_o << Vo$.

The use of heterogeneous integrated circuit in embodiments according to the present invention allows for such integration of DC-DC converters with array elements, in which, each array element may have one DC-DC converter. Such array may be modeled as a mesh of resistors as shown in FIG. 4. For example, by distributing power in the array elements, less resistance is experienced, and therefore less power.

For example, the power dissipated in the four row (16 elements) array depicted in FIG. 4 may be given by the following Equation 1.

$$P_{dis} = 4R_s I_o 2 (4^2 + 3^2 + 2^2 + 1^2) = 4R_s I_o^2 F(4) = 120 R_s I_o 2, \quad \text{(Equation 1)}$$

wherein $F(N) = N(N+1)(2N+1)/6$.

In Equation 1, the current into each converter, $I_o$, may be replaced using the converter efficiency giving $I_o = PA/\eta V_o$.

Combining this with the expression (Equation 1) for Power Plane $P_{dis}$ gives the following Equation 2, which shows a key point of the simple model.

$$P dis = 120 \times R_s \times (PA/\eta V_o) \quad \text{(Equation 2)}$$

The dissipated power in the panel is an inverse square function of the voltage on the panel plane and an inverse square function of the DC to DC conversion efficiency. The product of converter efficiency and power plane voltage should be maximized for the lowest power plane dissipation.

For example, the point of load powering of the radar may sit in unit cells or inter-stitially between the unit cells. In other words, the DC-DC converters may be positioned respectively between the unit cells or array elements. This allows for high density packing of RF circuits. Further, by application of the DC-DC converters according to embodiments of the present invention to flat panel AESAs, power distribution and conversion is enabled within the radar unit cell, thereby enabling advantageous features for ground based, air based, and space based applications.

Figure 5:
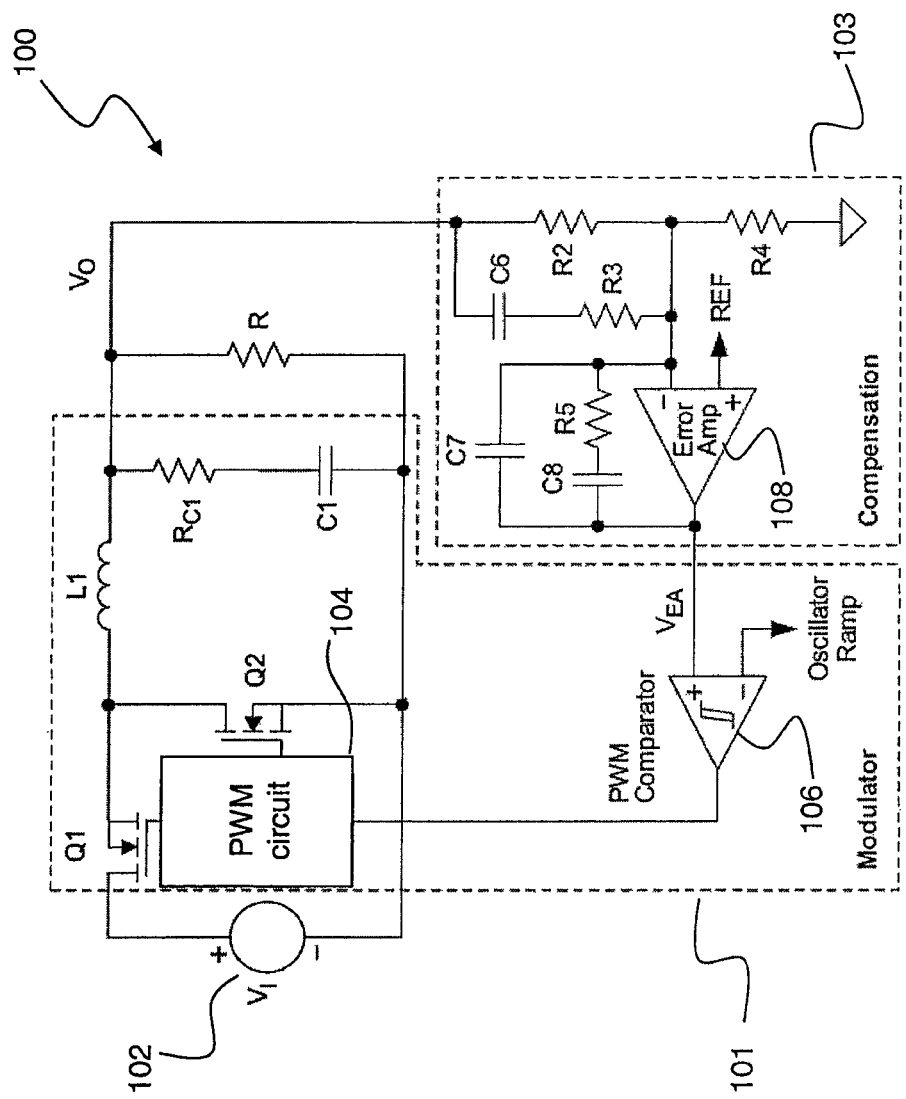
FIG. 5 is a schematic circuit diagram of a buck converter including a PWM circuit, and having a feedback loop, according to an embodiment of the present invention.

In embodiments according to the present invention, a buck converter may use a feedback loop to control the output voltage. FIG. 5 is a circuit diagram of a voltage converter 100 having a feedback loop. As can be seen in FIG. 5, the feedback loop includes a feedback voltage divider (resistors R2 and R4), an error amplifier 108 that receives a reference voltage reference REF as one of its inputs, and a comparator 106 (e.g., PWM comparator) that receives as one of its inputs, an output signal (e.g., Oscillator Ramp signal) from a sawtooth oscillator (not shown).

As can be seen in FIG. 5, a PWM circuit 104 is used to supply a PWM signal to a gate of the switching transistor Q2. The PWM circuit 104 may be an analog or digital PWM circuit, and generates a pulse-width-modulated clock to be applied to switches (FETs) Q1 and Q2, whose pulse width duty cycle D is related to Vin ($V_I$) and Vout ($V_o$) of the buck converter 100 by D=Vout/Vin. The PWM circuit 104 is controlled by the output of the PWM comparator 106.

The voltage converter (e.g., a synchronous buck converter with a feedback loop) 100 includes a first switch (FET) Q1 having a drain coupled to a positive terminal of the power source (e.g., voltage source) 102 that supplies voltage $V_I$, and a source coupled to a drain of a second switch (FET) Q2 that is coupled between the source of the first switch Q1 and a negative terminal of the power source 102. The PWM circuit 104 provides the driving signals to the gates of both the first and second switches Q1 and Q2.

An inductor L1 has a first end coupled to a node between the first switch Q1 and the second switch Q2. A resistor $R_{C1}$ and a capacitor C1 are coupled in series between a second end of the inductor L1 and the negative terminal of the power source 102. A resistor R is coupled in parallel with the resistor $R_{C1}$ and a capacitor C1, between the second end of the inductor L1 and the negative terminal of the power source 102.

The voltage divider (resistors R2 and R4), the error amplifier 108 and associated discrete components (capacitors and resistors) may together be referred to as a compensation circuit 103 (e.g., a feedback circuit). A capacitor C6 and a resistor R3 are coupled in series across the resistor R2 of the voltage divider (which includes the resistors R2 and R4). A first end of the resistor R4 is coupled to the resistor R2 at a node and a second end of the resistor R4 is coupled to ground. A voltage at the node between the resistors R2 and R4 is input into a negative input terminal of the error amplifier 108, while a positive input terminal of the error amplifier 108 is coupled to a reference voltage REF. A capacitor C8 and a resistor R5 are coupled in series between the negative input terminal of the error amplifier 108 and an output terminal of the error amplifier 108. A capacitor C7 is coupled in parallel with the capacitor C8 and the resistor R5, between the negative input terminal of the error amplifier 108 and the output terminal of the error amplifier 108.

With the above configuration, the error amplifier 108 generates an output signal $Y_{EA}$ that represents a difference (e.g., amplified difference) between the output voltage $V_o$ of the voltage converter 100 divided by the voltage divider (resistors R2 and R4), and the reference voltage REF. Hence, the output signal $V_{EA}$ of the error amplifier 108 in embodiments of the present invention is used in a feedback loop as a compensation signal of the compensation circuit 103.

The synchronous buck converter including the PWM circuit 104, together with the comparator 106, may be referred to as a modulator 101 (e.g., a conversion circuit). The comparator 106 receives as an input at its positive input terminal the output signal $V_{EA}$ of the error amplifier 108, and receives as an input at its negative input terminal an output of a sawtooth oscillator (not shown). The output of the sawtooth oscillator may also be referred to as an oscillator ramp signal. The output of the comparator 106 is provided as an input to the PWM circuit 104, and is used to vary or adjust the duty cycle of the PWM signal generated by the PWM circuit 104. This way, the feedback loop is used to ensure a substantially stable (or substantially constant) output voltage $V_o$, provided that a substantially constant input voltage $V_I$ is supplied.

After fully reviewing all of the disclosures herein, those skilled in the art would be able to select the types and values of all discrete components and logic chips to implement the voltage converter 100 without undue experimentation, provided that specific operational characteristics (e.g., input and output voltages, power requirement, etc.) are given for a particular implementation.

The PWM circuit 104 may be an analog PWM circuit or a digital PWM circuit. In the case where the PWM circuit 104 is implemented digitally, the digital PWM circuit 104 allows precise digital control, and may not require a use of analog circuits or oscillators. The digital PWM circuit 104 can be relatively easy to implement in digital circuits, e.g., a field programmable gate array (FPGA) and/or logic. Also, the digital PWM circuit 104 may be controlled with relative ease by an embedded microcontroller or microprocessor. Further, the digital PWM circuit 104 may allow for a complete software (SW) control/synthesis of the PWM waveform. The feedback loop compensation can be implemented in digital domain. Non-linear control loops for specific applications may also be available for the digital PWM circuit.

The digital PWM circuit 104 according to embodiments of the present invention enables low cost implementation using digital circuits, e.g., FPGA, and allows for integration with other CMOS or SiGe circuits. Further, the digital PWM circuit 104 may enable higher switching frequencies (e.g., compared to an analog PWM circuit), and may reduce size and weight of filters as well as improving control loop bandwidth (BW). The digital PWM circuit 104 may also allow proprietary algorithms to be written in software, such that the PWM waveform may be synthesized in software. Such software based synthesis of the PWM waveform, may enable easy field upgrades or changes for new applications. In addition, implementation of the digital PWM circuit 104 may facilitate heterogeneous integration of circuits. For example, the digital PWM circuit 104 may be implemented as a CMOS device, while the switches (e.g., FETs) for the buck converter may be implemented using a GaN process for high efficiency. In general, one chip solution may be more efficient, due to low parasitic inductance. This may also result in improved manufacturing and repair due to one chip system-on-chip (SOC) solution.

Figure 6:
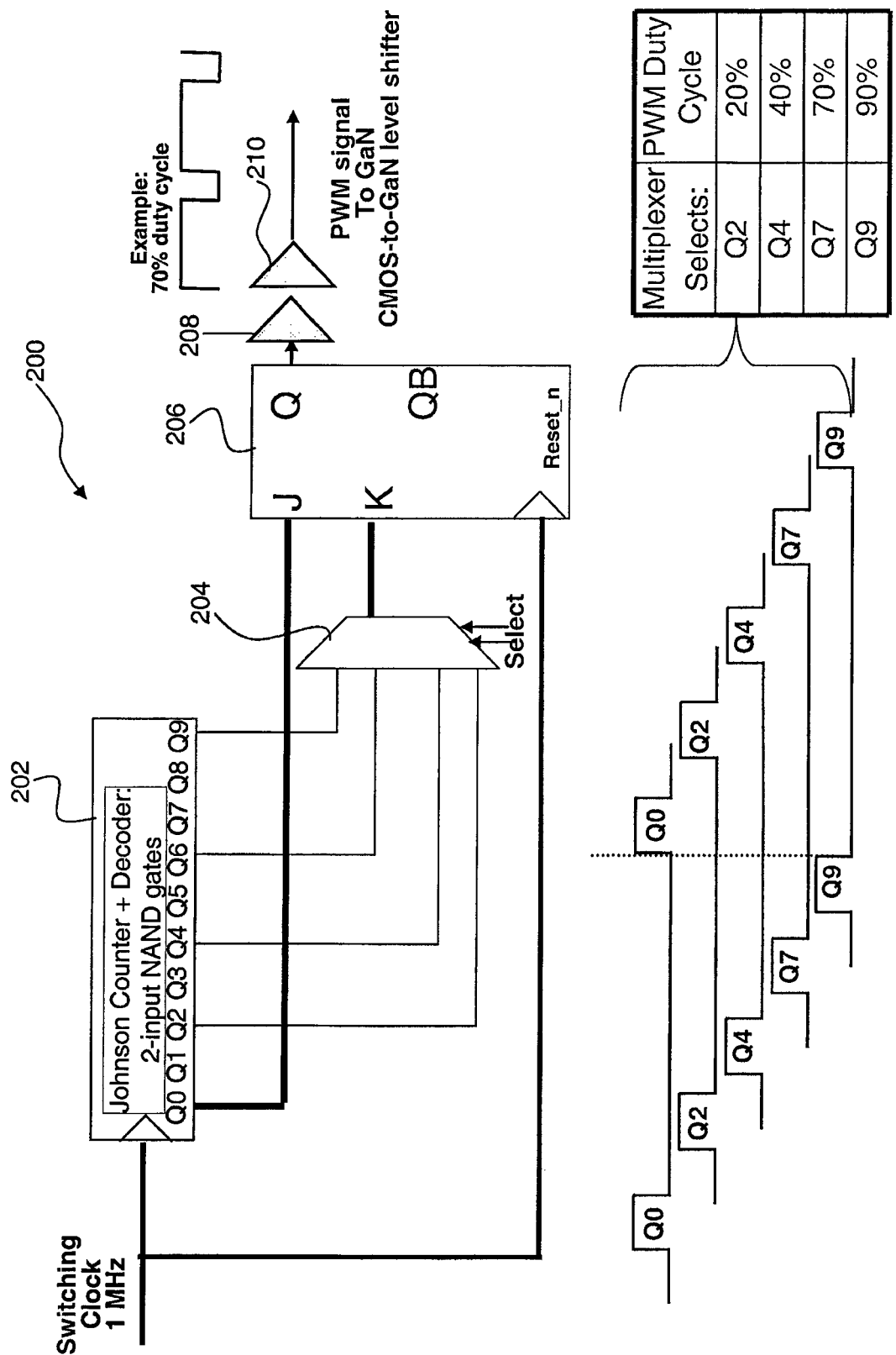
FIG. 6 is a block diagram of a digital PWM circuit according to an embodiment of the present invention.

In one embodiment, as illustrated in FIG. 6, a PWM circuit 200 (e.g., the digital PWM circuit 104 of FIG. 4) is implemented using a flip flop 206 (e.g., a JK flip flop (FF)) and a decoded counter 202. For example, the decoded counter 202 may include a Johnson counter and Decoder. An advantage of the counter according to embodiments of the present invention is that any state can be decoded using 2-input logic gates (e.g., NAND or NOR gates), for example.

In the embodiment of FIG. 6, the decoded counter 202 receives a 1 MHz switching clock and generates nine (9) outputs Q1-Q9. In the decoded counter 202, the rising edge of Q0 may set the counter every 10 cycles. The rising edge of selected Q1-Q9 may reset the counter, the duty cycle D=Qx*10% where x=1 to 9. In this particular embodiment, the outputs Q2, Q4, Q6, Q9 are provided to a multiplexer 204.

As can be seen in a timing diagram and a table of FIG. 4, the multiplexer 204 may be used to select the PWM duty cycles of 20%, 40%, 70% and 90%, respectively. While only nine (9) outputs Q1-Q9 are illustrated in FIG. 6, the present invention is not limited thereto. For example, decoded counters in other embodiments may have a large number (e.g., up to 1,000) of outputs depending on design requirements.

The flip flop 206 also receives the 1 MHz switching clock, as well as the output QO (from the decoded counter 202), and an output of the multiplexer 204. The flip flop 206 in the described embodiment is a JK flip flop whose output is set to a logic High when J=1, or reset to a logic Low when K=1. By this circuit design, the J and K inputs are never allowed to be simultaneously both 1. Therefore, the Q0 output from the decoded counter 202 applied to the J input sets the PWM signal, and the output signal of the multiplexer 204 resets the PWM signal when one of the Q2, Q4, Q6, Q9 outputs from the decoded counter 202 causes the multiplexer 204 to apply a selection signal to the K input, while the Q0 output is at logic low. This way, the duty cycle of the PWM signal can be selected/adjusted. The buffers 208 and 210 may be used to drive the output of the flip flop 206 to provide as the output of the PWM circuit 200. For example, the buffers 208 and 210 may together operate as a level shifter (e.g., to shift from a CMOS signal level to a GaN signal level).

After fully reviewing all of the disclosures herein, those skilled in the art would be able to select the types and values of all discrete components and logic chips to implement the PWM circuit 200 without undue experimentation, provided that specific operational characteristics (e.g., desired fabrication technology (e.g., CMOS, GaN), etc.) are given for a particular implementation.

In one particular embodiment, one or more of the circuit components of the PWM circuit 200 may be implemented using standard cells known to those skilled the art. For example, the counted decoder 202 may be implemented using five (5) D flip flop with reset cells to make a 10 state Johnson counter, and ten (10) 2-input NOR cells to make 10 gates for decoding 10 states of the Johnson counter.

In addition, the multiplexer 204 may be implemented using a multiplexer cell to select one of four reset signals generated by the decoded counter 202. Further, the flip flop 206 may be implemented using a JK flip flop with reset cell to generate the PWM signal. Still further, buffers 208 and 210 may be respectively implemented using one or more buffer cells to drive the output signal of the flip flop 206. For example, the buffers 208 and 210 may be used to level shift the output signal (e.g., having CMOS logic level) of the flip flop 206 to the voltage level required for the GaN-implemented circuit.

While examples of cells are provided above, the present invention is not limited thereto, and those skilled in the art would be able to select appropriate circuits, chips, cells, cell libraries, fabrication technology, etc. based on the disclosures herein, to fully practice the embodiments of the invention without undue experimentation.

Figures 7A, 7B:
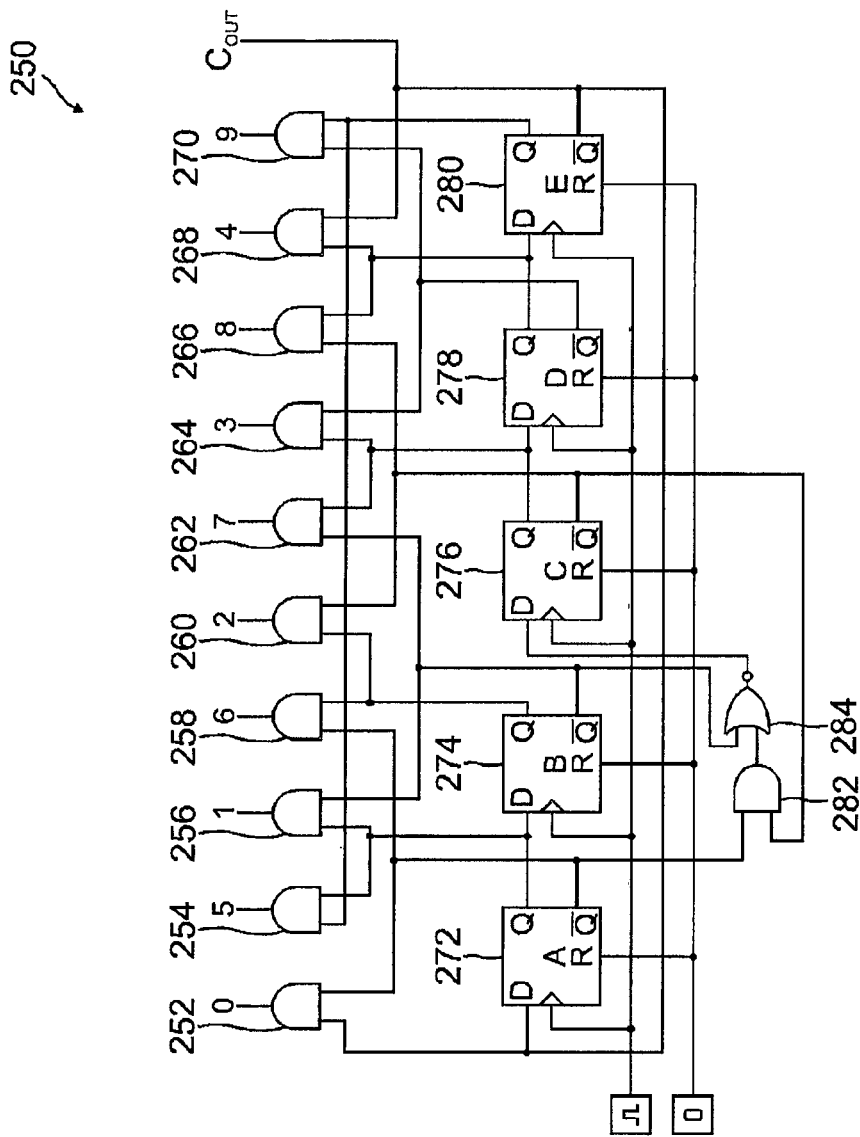
FIGS. 7A and 7B are a logical circuit diagram and a state table of a Johnson counter and decoder of a digital PWM circuit according to an embodiment of the present invention.

A logical circuit diagram of a Johnson counter is shown in FIG. 7A, and a state table of the Johnson counter is shown in FIG. 7B. The Johnson counter has the following features in the embodiment of FIGS. 7A and 7B. The Johnson counter of FIG. 7A is made with a shift register or five (5) flip-flops (e.g., D flip flops A, B, C, D, E) 272, 274, 276, 278, 280. Depending on the number of bits desired to be counted, the number of flip flops may be different in other embodiments. Each of the five D flip flops receives a clock signal (e.g., 1 MHz switching clock signal of FIG. 4). Also, each of the five D flip flops receives a logic low signal at its R input.

The first D flip flop 272 receives a QBar output of the last D flip flop 280 as a D input. The QBar output of the last D flip flop 280 is also the counter output $C_{OUT}$. The Q output of the first flip flop 272 is provided as a D input to the second D flip flop 274. A QBar output of the first D flip flop is AND'd with a QBar output of the third D flip flop 276 by an AND gate 282, and an output of the AND gate 282 is provided as an input to a NOR gate 284. The NOR gate 284 also receives a QBar output of the second D flip flop 274 as an input, and provides an output as a D input to the third D flip flop 276. A Q output of the third D flip flop 276 is provided as a D input to the fourth D flip flop 278. A Q output of the fourth D flip flop 278 is provided as a D input to the fifth D flip flop 280.

A first AND gate 252 receives the QBar output of the fifth D flip flop 280 and the QBar output of the first D flip flop 272 to generate an initial decoded output 0. A second AND gate 254 receives a Q output of the fifth D flip flop 280 and the Q output of the first D flip flop 272 to generate a fifth decoded output 5. A third AND gate 256 receives the Q output of the first D flip flop 272 and the QBar output of the second D flip flop 274 to generate a first decoded output 1. A fourth AND gate 258 receives the QBar output of the first D flip flop 272 and a Q output of the second D flip flop 274 to generate a sixth decoded output 6. A fifth AND gate 260 receives the Q output of the second D flip flop 274 and the QBar output of the third D flip flop 276 to generate a second decoded output 2. A sixth AND gate 262 receives the QBar output of the second D flip flop 274 and the Q output of the third D flip flop 276 to generate a seventh decoded output 7. A seventh AND gate 264 receives the Q output of the third D flip flop 276 and a QBar output of the fourth D flip flop 278 to generate a third decoded output 3. An eighth AND gate 266 receives the QBar output of the third D flip flop 276 and the Q output of the fourth D flip flop 278 to generate an eighth decoded output 8. A ninth AND gate 268 receives the Q output of the fourth D flip flop 278 and the QBar output of the fifth D flip flop 280 to generate a fourth decoded output 4. A tenth AND gate 270 receives the QBar output of the fourth D flip flop 278 and the Q output of the fifth D flip flop 280 to generate a ninth decoded output 9.

For example, a Johnson counter is a walking ring counter, which means that it goes from 1000 to 1100 to 1110 to 1111 to 0111 to 0011 to 0001 to 0000 (this 4 bit example has 2*N=8 states). For each clock pulse, only one bit changes (hence built-in error detection), such that N flip-flops provide 2N states (as opposed to 2^AN states). Any state can be decoded with a 2-input logic gate.

Those skilled in the art would know how to modify the decoded counter circuit (including Johnson counter and decoder) without undue experimentation. For example, the AND gates 252-268 may be replaced with NOR gates, and those skilled in the art would know how to rearrange inputs and outputs to implement the decoder circuit based on NOR gates.

While the embodiments of the present invention are described in reference to a Johnson counter, the present invention is not limited thereto. In other embodiments, any suitable counter (e.g., a suitable walking ring counter) that are known to those skilled in the art may be used.

Figure 8A:
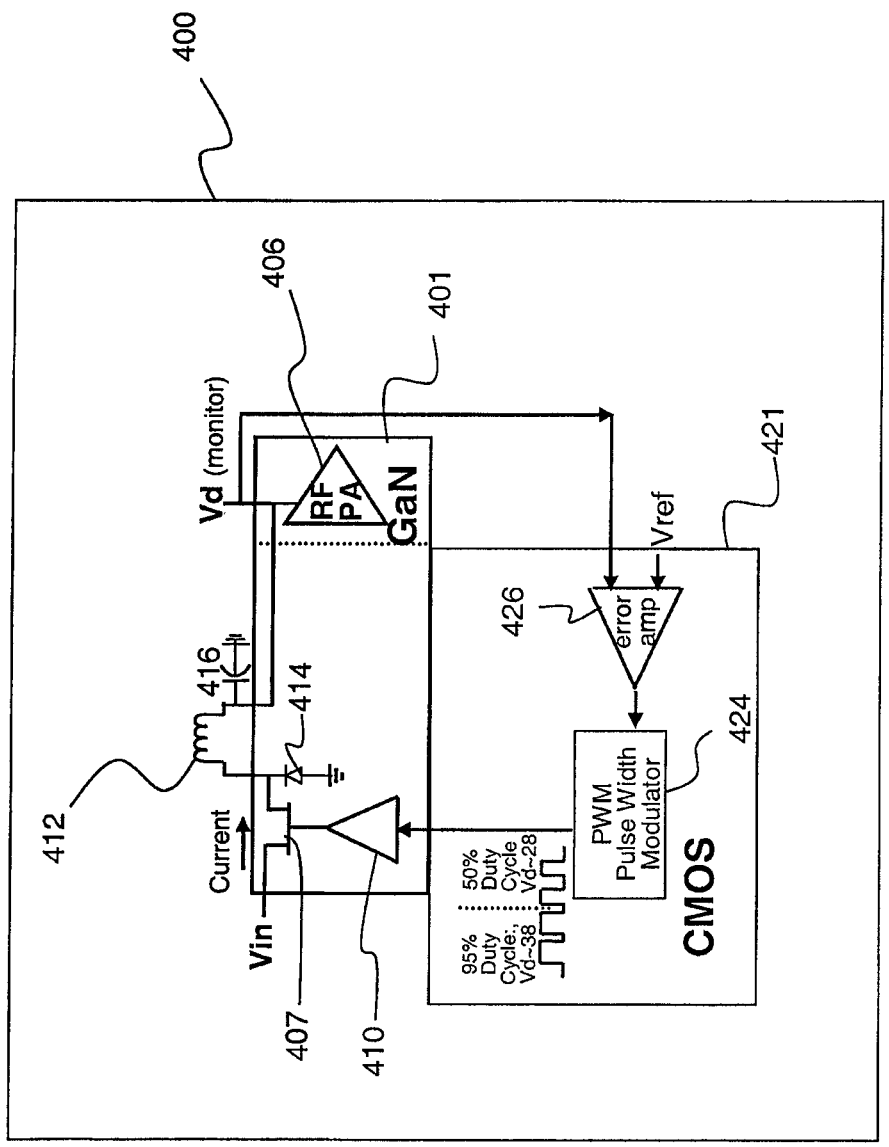
FIGS. 8A and 8B are schematic circuit diagrams of digital PWM circuits, together with an RF power amplifier (RF PA), according to embodiments of the present invention.
Figure 8B:
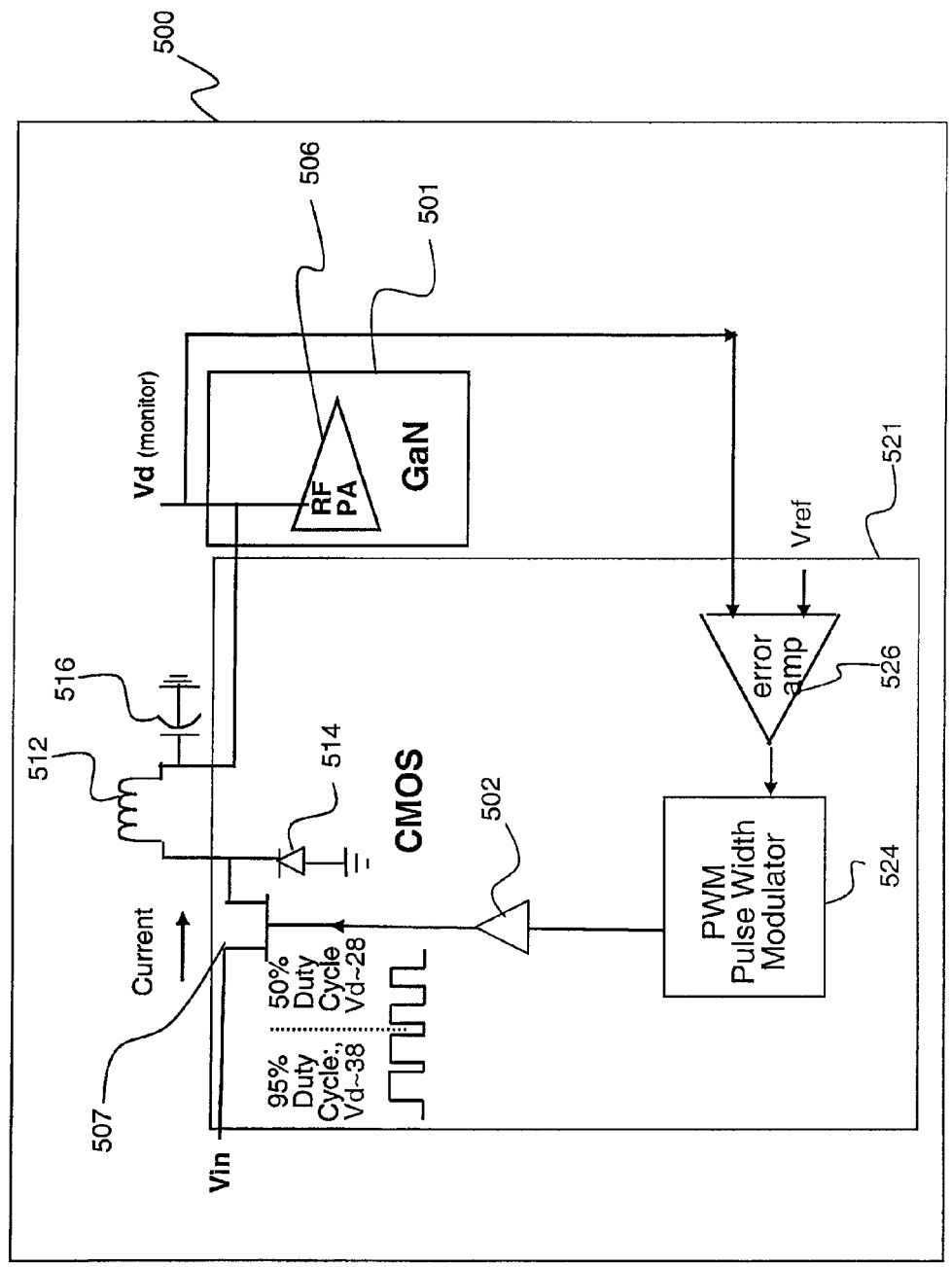

FIGS. 8A and 8B respectively illustrate different variations of synchronous buck converter implementation together with an RF power amplifier (RF PA).

In FIG. 8A, the power amplifier and the DC-DC converter transistor FETs are implemented in a heterogeneous integrated circuit, using GaN, and the buck converter controller is implemented using CMOS. In this embodiments, the inductance in Vd supply may be reduced or minimized. In the heterogeneous integrated circuit 400 of FIG. 8A, a CMOS controller 421 is integrally implemented on a common substrate with GaN circuitry 401, which includes GaN FET 407, a level shifter and gate driver 410, and an RF PA 406. The dotted line in FIG. 8A indicates that the RF PA may or may not be monolithically integrated with the DC-DC-converter. For example, the RF PA in some embodiments may be external to the heterogeneous integrated circuit chip, and in other embodiments, the RF PA may be integrally formed in the heterogeneous integrated circuit chip to realize a one chip solution.

The CMOS controller 421 includes a PWM controller 424, and an error amplifier 426. The error amplifier 426 forms a feedback loop by comparing the drain voltage Vd of the RF PA with a reference voltage Vref. The comparison result is provided to the PWM controller 424, and depending on the comparison result, the PWM controller 424 varies (or adjusts) the duty cycle of the output signal. For example, given a same input voltage Vin (e.g., 40V), a 50% duty cycle of the PWM signal might generate Vd of about 28V, while a 95% duty cycle of the PWM signal might generate Vd of about 38V.

The PWM signal outputted by the PWM controller 424 is provided to the level shift and gate driver 410, which is used, for example, to convert the voltage level of the CMOS PWM signal to the voltage level suitable for driving a GaN FET (e.g., high electron mobility transistor (HEMT)), to be applied to a gate of the GaN FET 407. The GaN FET 407 receives the input voltage Vin at its first electrode, and is coupled to a first end of an inductor 412, which is implemented externally to the heterogeneous integrated circuit 400. A second end of the inductor 412 is coupled to ground via a capacitor 416, which is also implemented externally to the heterogeneous integrated circuit 400. The node between a second electrode of the first GaN FET 407 and the first end of the inductor 412, is coupled to a cathode of a diode 414 in the heterogeneous integrated circuit, and an anode of the diode 414 is coupled to ground. The second end of the inductor 412 is also coupled to a Vd input of the RF PA 406.

A heterogeneous integrated circuit 500 of FIG. 8B is substantially similar to the heterogeneous integrated circuit 400 of FIG. 8A, except that only an RF PA 506 is implemented using GaN process, whereas the rest of the circuits are implemented using CMOS. For example, this design might be desirable in terms of cost savings because CMOS should be maximized when feasible to reduce the cost of fabrication.

The CMOS circuitry 521 includes a PWM controller 524 (e.g., a PWM pulse width modulator), and an error amplifier 526. The CMOS circuitry 521 also includes a FET 507 and a gate driver 502.

The error amplifier 526 forms a feedback loop by comparing the drain voltage Vd of the RF PA 506 with a reference voltage Vref. The comparison result is provided to the PWM controller 524, and depending on the comparison result, the PWM controller 524 varies the duty cycle of the output PWM signal. For example, given a same input voltage Vin (e.g., 40V), a 50% duty cycle of the PWM signal might generate Vd of about 28V, while a 95% duty cycle of the PWM signal might generate Vd of about 38V.

The PWM signal outputted by the PWM controller 524 is applied through the gate driver 502 to a gate of the FET 507. The FET 507 receives the input voltage Vin at its first electrode, and is coupled to a first end of an inductor 512, which is implemented externally to the heterogeneous integrated circuit 500. A second end of the inductor 512 is coupled to ground via a capacitor 516, which is also implemented externally to the heterogeneous integrated circuit 500. The node between a second electrode of the FET 507 and the first end of the inductor 512, is coupled to a cathode of a diode 514 that is implemented in CMOS circuitry of the heterogeneous integrated circuit 500, and an anode of the diode 514 is coupled to ground. The second end of the inductor 512 is also coupled to the Vd input of the RF PA 506.

Figure 9:
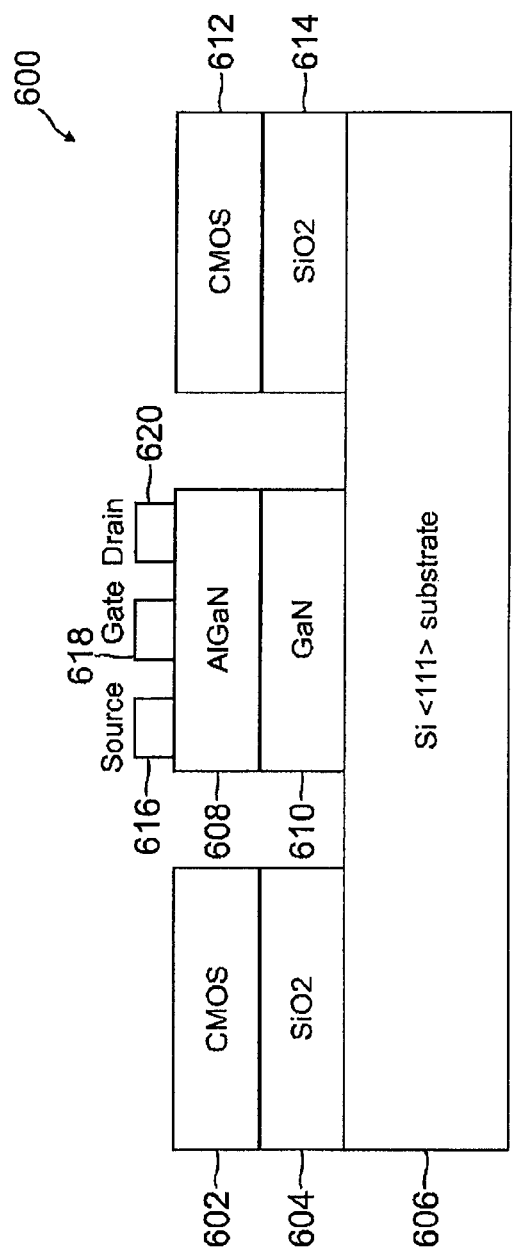
FIG. 9 is a cross-sectional view of a heterogeneous integrated circuit of CMOS and GaN devices on a common substrate in embodiments according to the present invention.

FIG. 9 is a cross-sectional view of a heterogeneous integrated circuit (IC) 600 according to an embodiment of the present invention. The heterogeneous IC 600 includes a silicon (Si) <111> substrate 606 as a common substrate on which GaN circuitry and CMOS circuits are fabricated. An example of such heterogeneous IC is disclosed in U.S. Pre-Grant Patent Publication No. 2011/0180857, entitled "Structure Having Silicon CMOS Transistors with Column III-V Transistors on a Common Substrate," the entire content of which is enclosed herein by reference.

The heterogeneous IC 600 includes a layer of $SiO_2$ 604, 614, and respective CMOS circuitry 602, 612 formed thereon. A GaN layer 610 is formed between the $SiO_2$ layers 604 and 614 that are spaced from each other. A GaN circuitry is fabricated in the GaN layer 610, which may have a thickness of about 2 µm, for example. A layer of AlGaN 608 is formed on the GaN layer 610, for example, to a thickness of about 25 nm. On the AlGaN layer 608, source, gate and drain contacts 616, 618 and 620 may be formed to provide contacts for the GaN FET (e.g., HEMT) formed in the GaN layer 610. The thicknesses of the layers as shown and described in this application are for illustrative purposes only, and the present invention is not limited thereto.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A heterogeneous integrated circuit (100, 400, 500) comprising:
    a voltage converter (101) configured to receive an input voltage, and to convert the input voltage to an output voltage that is different from the input voltage, the voltage converter (101) comprising a PWM circuit (104, 200);
    a feedback circuit (103) configured to receive the output voltage, and to generate a control signal used to vary a pulse width of a PWM signal generated by the PWM circuit, the feedback circuit comprising an error amplifier (108, 426, 526); and
    a comparator (106) configured to generate a PWM control signal and to supply the PWM control signal to the PWM circuit (104, 200) to vary the PWM signal,
    wherein the voltage converter (101) and the feedback circuit (103) together comprise at least one gallium nitride (GaN) circuit element and at least one CMOS circuit element that are integrated on a common substrate, and wherein the error amplifier is directly connected to the comparator.

2. The heterogeneous integrated circuit (100, 400, 500) of claim 1, wherein the PWM circuit (104, 200) is a digital PWM circuit, and comprises a counter (202), a decoder (202), and a flip flop (206).

3. The heterogeneous integrated circuit (100, 400, 500) of claim 2, wherein the PWM circuit (104, 200) comprises CMOS circuitry.

4. The heterogeneous integrated circuit (100, 400, 500) of claim 3, further comprising a level shifter (210) to change a voltage level of the PWM signal outputted by the PWM circuit (104, 200) from a CMOS circuit level to a GaN circuit level.

5. The heterogeneous integrated circuit (100, 400, 500) of claim 2, wherein the counter comprises a Johnson counter (202), and the flip flop comprises a JK flip flop (206).

6. The heterogeneous integrated circuit (100, 400, 500) of claim 1, wherein the voltage converter comprises a first GaN FET (Q1) and a second GaN FET (Q2), wherein the PWM signal outputted by the PWM circuit (104, 200) is applied to gates of the GaN FETs (Q1, Q2).

7. The heterogeneous integrated circuit (100, 400, 500) of claim 1, wherein the error amplifier (108, 426, 526) is configured to generate the control signal by comparing an output voltage of the voltage converter (101) with a reference voltage (Vref).

8. The heterogeneous integrated circuit (100, 400, 500) of claim 7, wherein the PWM control signal is generated using the control signal from the error amplifier (108, 426, 526).

9. The heterogeneous integrated circuit (100, 400, 500) of claim 1, wherein the voltage converter comprises a GaN FET (407) and a level shifter and gate driver (410), wherein the GaN FET receives the PWM signal from the PWM circuit (424) through the level shifter and gate driver (410).

10. The heterogeneous integrated circuit (100, 400, 500) of claim 9, wherein the PWM circuit (424) is implemented in CMOS.

11. The heterogeneous integrated circuit (100, 400, 500) of claim 10, wherein the level shifter and gate driver (410) is implemented in GaN, and is configured to adjust a voltage level of the PWM signal from a CMOS circuit level to a GaN circuit level.

12. The heterogeneous integrated circuit (100, 400, 500) of claim 11, further comprising an RF power amplifier (RF PA) (406) configured to receive a voltage output of the voltage converter as a drain voltage (Vd) input, wherein the RF PA is implemented in GaN.

13. The heterogeneous integrated circuit (100, 400, 500) of claim 1, wherein the PWM circuit (104) comprises a software algorithm for software-based synthesis of the PWM signal.

* * * * *